(12) United States Patent
Serikawa

(10) Patent No.: US 11,670,758 B2
(45) Date of Patent: Jun. 6, 2023

(54) NEGATIVE-ELECTRODE COMPOSITION FOR ALKALINE SECONDARY BATTERIES, AND ALKALINE SECONDARY BATTERY NEGATIVE ELECTRODE

(71) Applicant: TOPPAN PRINTING CO.,LTD., Tokyo (JP)

(72) Inventor: Masahiro Serikawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 195 days.

(21) Appl. No.: 17/083,207

(22) Filed: Oct. 28, 2020

(65) Prior Publication Data

US 2021/0057724 A1 Feb. 25, 2021

Related U.S. Application Data

(63) Continuation of application No. PCT/JP2019/024677, filed on Jun. 21, 2019.

(30) Foreign Application Priority Data

Jun. 25, 2018 (JP) .............................. JP2018-120215

(51) Int. Cl.
*H01M 4/24* (2006.01)
*H01M 4/38* (2006.01)
(Continued)

(52) U.S. Cl.
CPC ........... *H01M 4/242* (2013.01); *H01M 4/383* (2013.01); *H01M 4/622* (2013.01); *H01M 4/625* (2013.01);
(Continued)

(58) Field of Classification Search
CPC ...................................................... H01M 4/383
See application file for complete search history.

(56) References Cited

U.S. PATENT DOCUMENTS 5,965,295 A * 10/1999 Bando ................... H01M 10/28
429/223
2015/0010812 A1 1/2015 Ohyama et al.
(Continued)

FOREIGN PATENT DOCUMENTS

EP 1271677 A1 * 1/2003 ........... C01B 3/0057
JP H09-199120 A 7/1997
(Continued)

OTHER PUBLICATIONS

International Searching Authority, "International Search Report," issued in connection with International Patent Application No. PCT/JP2019/024677, dated Sep. 17, 2019.
(Continued)

*Primary Examiner* — Stephan J Essex
(74) *Attorney, Agent, or Firm* — Foley & Lardner LLP

(57) ABSTRACT

An alkaline secondary battery negative electrode and a composition forming the negative electrode, containing an active material, a binder resin, and an electrically conductive agent containing an electrically conductive carbon material. When a value of D50 is defined to be an average particle size X and a value of D20 is defined to be a particle size Y in a cumulative particle size distribution obtained by measuring the active material using a laser diffractometry particle size distribution meter, the average particle size X is 10 μm or less, and the particle size Y is in the range of 30% to 70% of the average particle size X.

3 Claims, 1 Drawing Sheet

(51) Int. Cl.
*H01M 4/62* (2006.01)
*H01M 4/66* (2006.01)
*H01M 10/24* (2006.01)
*H01M 4/02* (2006.01)

(52) U.S. Cl.
CPC ........... *H01M 4/661* (2013.01); *H01M 10/24* (2013.01); *H01M 2004/021* (2013.01); *H01M 2004/027* (2013.01)

(56) References Cited

U.S. PATENT DOCUMENTS

| 2018/0254519 A1 | 9/2018 | Maeda et al. |
| 2019/0043675 A1 | 2/2019 | Kobayashi et al. |

FOREIGN PATENT DOCUMENTS

| JP | 2000-038606 A | | 2/2000 | |
| JP | 2000-092491 A | | 3/2000 | |
| JP | 2000-182608 A | | 6/2000 | |
| JP | 2000182608 A | * | 6/2000 | |
| JP | 2001-135311 A | | 5/2001 | |
| JP | 2003-007293 A | | 1/2003 | |
| JP | 4698291 B2 | | 6/2011 | |
| JP | 2011-165680 A | | 8/2011 | |
| JP | 2018-045820 A | | 3/2018 | |
| WO | WO-2006022168 A1 | * | 3/2006 | ........... C01B 3/0057 |
| WO | WO-2017/047378 A1 | | 3/2017 | |
| WO | WO-2017/135405 A1 | | 8/2017 | |

OTHER PUBLICATIONS

International Searching Authority, "Written Opinion," issued in connection with International Patent Application No. PCT/JP2019/024677, dated Sep. 17, 2019.

European Extended Search Report, dated Jul. 20, 2021, issued in corresponding European Patent Application No. 19825776.8, (8 pages).

Notice of Reason for Refusal issued in connection with JP Appl. Ser. No. 2018-120215 dated Jun. 29, 2022 (4 pages).

Japanese Office Action issued in connection with JP Appl. Ser. No. 2018-120215 dated Nov. 15, 2022 (4 pages).

* cited by examiner

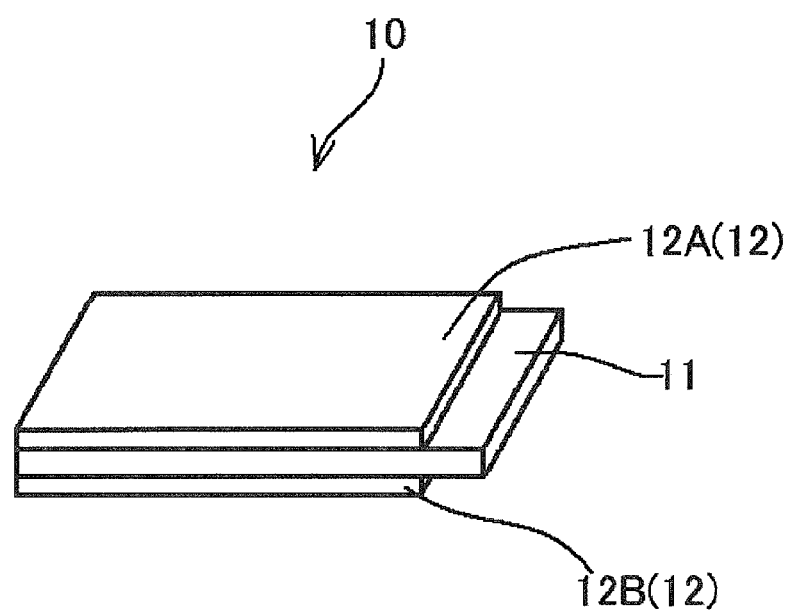

NEGATIVE-ELECTRODE COMPOSITION FOR ALKALINE SECONDARY BATTERIES, AND ALKALINE SECONDARY BATTERY NEGATIVE ELECTRODE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/024677, filed on Jun. 21, 2019, which is based upon and claims the benefit of priority to Japanese Patent Application No. 2018-120215, filed on Jun. 25, 2018, the disclosures of which are all incorporated herein by reference in their entireties.

TECHNICAL FIELD

The present invention relates to a negative-electrode composition for alkaline secondary batteries, and an alkaline secondary battery negative electrode.

BACKGROUND

Alkaline secondary batteries are in high demand recently for applications requiring high output power, such as hybrid electric vehicles (HEVs) or electric tools. Techniques related to methods of achieving higher output power are known as disclosed in PTLs 1 to 3. As such, studies for uniforming the facing areas of electrodes or the particle size distribution of a negative-electrode alloy are underway.

CITATION LIST

[Patent Literature] PTL 1: JP 2000-092491 A; PTL 2: JP 2001-135311 A; PTL 3: JP 4698291 B2.

SUMMARY OF THE INVENTION

Technical Problem

However, there is still room for improving the balance between the output characteristics and durability (cycle life) of batteries, in the techniques as disclosed in PTLs 1 to 3.

The present invention has been made in light of the circumstances set forth above and aims to provide an alkaline secondary battery negative electrode and a composition forming the negative electrode, which can achieve an improved high-level balance between the output characteristics and cycle life of batteries.

Solution to Problem

A negative-electrode composition for alkaline secondary batteries according to an aspect of the present invention for solving the above issues contains an active material, a binder resin, and an electrically conductive agent containing an electrically conductive carbon material. When a value of D50 is defined to be an average particle size X and a value of D20 is defined to be a particle size Y in a cumulative particle size distribution obtained by measuring the active material using a laser diffractometry particle size distribution meter, the average particle size X is 10 µm or less, and the particle size Y is in a range of 30% or more and 70% or less of the average particle size X.

An alkaline secondary battery negative electrode as an aspect for solving the above issues includes a sheet-shaped metal substrate on which the negative-electrode composition for alkaline secondary batteries is laminated.

The negative-electrode composition for alkaline secondary batteries contains an active material, a binder resin, and an electrically conductive agent containing an electrically conductive carbon material. When a value of D50 is defined to be an average particle size X and a value of D20 is defined to be a particle size Y in a cumulative particle size distribution obtained by measuring the active material using a laser diffractometry particle size distribution meter, the average particle size X is 10 µm or less, and the particle size Y is in a range of 30% or more and 70% or less of the average particle size X.

Advantageous Effects of the Invention

According to an aspect of the present invention, there are provided an alkaline secondary battery negative electrode and a composition forming the negative electrode, which can achieve an improved high-level balance between the output characteristics and cycle life.

BRIEF DESCRIPTION OF THE DRAWINGS

The FIGURE is a perspective view illustrating a configuration of an alkaline secondary battery negative electrode according to an embodiment.

DETAILED DESCRIPTION

Embodiments of the present invention of will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

(Alkaline Secondary Battery Negative Electrode)

The FIGURE shows an alkaline secondary battery negative electrode 10 according to the present embodiment, including a substrate 11 and negative-electrode composite layers 12A and 12B respectively formed on both surfaces of the substrate 11. The negative-electrode composite layer 12 herein may be provided to one surface or each of both surfaces of the substrate 11. A mode of the configuration of the alkaline secondary battery negative electrode 10 may be a laminate in which a substrate 11 and a negative-electrode composite layer 12 are laminated to each other. Specifically, the alkaline secondary battery negative electrode 10 may be at least a laminate in which a substrate 11 and a negative-electrode composite layer 12 are laminated to each other or in which a substrate 11 is sandwiched between two negative-electrode composite layers 12. The negative-electrode composite layer 12 is formed by applying a composite ink containing an electrically conductive agent onto the substrate 11.

<Substrate>

The substrate 11 is a flexible plate-shaped member made of metal. The substrate is formed, for example, of a foil-shaped current collector having flat and smooth surfaces and end faces obtained by thinly beating metal. Therefore, materials for the substrate 11 do not include nickel foam, or materials having asperities due to a porous material structure that is inconvenient for forming a negative-electrode composite layer 12, but may include aperture-formed materials having a two-dimensional structure (e.g., punched plates).

[Materials for Substrate]

From the perspective of alkaline electrolyte resistance, the material for the substrate 11 is preferred to be nickel. From the perspective of cost, the substrate 11 is preferred to be obtained by nickel-plating the surfaces of an iron material by an electrolytic solution to prevent corrosion.

A plate-shaped foil having flat and smooth surfaces suitable for applying a negative-electrode composite ink thereto is used for the substrate 11.

[Thickness of Substrate]

The substrate 11 is preferred to have a thickness, for example, in the range of 4 μm or more and 40 μm or less. When the thickness of the substrate 11 is 4 μm or more, the strength of the substrate 11 may be further improved, and the electrode is less likely to be damaged during coating or pressing. When the thickness of the substrate 11 is 40 μm or less, the strength of the substrate 11 may be easily adjusted, and the substrate 11 may be taken up more easily during coating. Specifically, when the thickness of the substrate 11 is 4 μm or more and 40 μm or less, for example, durability can be imparted to the negative electrode with a surface configuration where no wrinkling or separation can be visually observed when pressed (e.g., roll gap: 0, pressing force: 5t). If an aperture-formed material having a two-dimensional structure is used as a substrate 11, the upper limit of the above range may be exceeded depending on the aperture density, as long as the negative electrode does not break when produced and has durability with a surface configuration where no wrinkling or separation can be visually observed.

[Thickness of Nickel Plating]

If a nickel-plated substrate is used as the substrate 11 as mentioned above, the nickel plating is preferred to have a thickness in the range of 0.1 μm or more and 5 μm or less, and more preferably 0.2 μm or more and 3 μm or less. When the thickness of the nickel plating is 0.1 μm or more, corrosion due to the electrolytic solution is less likely to occur. Nickel plating having a thickness of 5 μm or less is advantageous from the perspective of cost.

<Negative-Electrode Composite Layer>

The negative-electrode composite layer 12 is provided on the support 11 and contains at least a negative-electrode active material, an electrically conductive agent, and a binder resin. The negative-electrode composite layer 12 may contain other additives as long as the advantageous effects of the present invention are not impaired, and thus may contain, for example, a radical scavenger, such as a hindered amine light stabilizer. If the negative-electrode composite layer 12 contains a radical scavenger, the content of the radical scavenger relative to the active material may be in the range of 0.01 wt % or more and 2.0 wt % or less.

The negative-electrode composite layer 12 is formed by applying a composite ink (negative-electrode composition for alkaline secondary batteries) onto the substrate 11. Specifically, the composite ink may contain at least a negative-electrode active material, an electrically conductive agent, and a binder resin, and may also contain a radical scavenger as necessary. The negative-electrode composite layer 12 may have a thickness, for example, in the range of 20 μm or more and 120 μm or less.

[Negative-Electrode Active Material]

As the negative-electrode active material, materials known as negative-electrode active materials for alkaline secondary batteries may be used. For example, such materials may include hydrogen storage alloys, zinc, cadmium and iron. The hydrogen storage alloys are not particularly limited as long as they can store hydrogen that is electrochemically generated in the electrolytic solution and can easily discharge the stored hydrogen during discharge operation, and thus can be appropriately selected according to purposes.

[Particle Size of Negative-Electrode Active Material]

The negative-electrode active material has an average particle size in the range of 0.01 μm or more and 10 μm or less, as a particle size D50 in a volume-based particle size distribution, and in the range of 30% or more and 70% or less of the particle size D50, as a particle size D20 in the volume-based particle size distribution.

Specifically, a negative-electrode active material having a particle size X in the range of 0.01 μm or more and 10 μm or less and a particle size Y in the range of 30% or more and 70% or less of the particle size X is used, where the particle size X is a value of D50 and the particle size Y is a value of D20 in a cumulative particle size distribution measured by a laser diffractometry particle size distribution meter.

The particle size X is preferred to be in the range of 0.1 μm or more and 10 μm or less.

The average particle size may be calculated using, for example, a dynamic light scattering type particle size distribution meter (Microtrac MT3100II manufactured by MicrotracBEL Corp.). Specifically, in a volume-based particle size distribution of a mixture of particles, water and a dispersion obtained using this meter, volume ratios of the particles are integrated in the order of smaller to larger particle size. In the present embodiment, an average particle size at an integrated volume ratio of 50% (median size) is referred to as D50 and similarly a particle size at an integrated volume ratio of 20% is referred to as D20.

[Mixing Ratio of Negative-Electrode Active Material]

The ratio of the active material relative to a total non-volatile content of a composite ink is preferred to be in the range of 80 wt % or more and 98 wt % or less, and more preferably 85 wt % or more and 95 wt % or less.

[Electrically Conductive Agent]

The composite ink mentioned above contains an electrically conductive agent. The electrically conductive agent may, for example, be a nickel powder, cobalt oxide, cobalt hydroxide, carbon, or the like. These materials may be used in combination of two or more. Of these materials, an electrically conductive agent of carbon is preferred, or graphite or particulate carbon is also preferred.

The electrically conductive agent of carbon may be carbon black, graphite, carbon nanotubes, carbon fibers, or fullerenes. Carbon black includes, for example, amorphous carbon and particulate carbon. Particulate carbon may include graphitized carbon, acetylene black, Ketjen black, and furnace black. Of these materials, amorphous carbon, graphitized carbon, acetylene black or furnace black is preferred.

The above-mentioned carbon black is preferred to be furnace black produced by continuous thermal decomposition of a gas or a liquid raw material in a reactor, in particular, Ketjen black produced from ethylene heavy oil as a raw material, or preferred to be channel black produced by burning a raw material gas and applying the flame to the bottom of channel steel, followed by quenching and precipitating, thermal black produced from a gas as a raw material by periodically repeating burning and thermal decomposition, in particular, acetylene black produced from acetylene gas as a raw material, or other carbon black. In addition, oxidized carbon black, hollow carbon, or the like as usually produced may also be used. These carbon black materials may be used singly or in combination of two or more. It should be noted that when these carbon black materials are further thermally processed (graphitized), graphitized carbon materials can be obtained.

Carbon black is preferred to have an average primary particle size in the range of 0.01 μm or more and 0.3 μm or less. The average primary particle size can be obtained by appropriately magnifying carbon black 10,000 to 100,000 times using a transmission electron microscope (TEM) and averaging the sizes of 10 to 50 particles in the image of the magnified carbon black. As the specific surface area of carbon black increases, contact points between the particles of the carbon black increase. This is advantageous for decreasing internal resistance of electrodes. Specifically, a specific surface area calculated from an adsorption amount of nitrogen (BET) is preferred to be in the range of 20 $m^2/g$ or more and 1,500 $m^2/g$ or less, more preferably 50 $m^2/g$ or more and 1,500 $m^2/g$ or less, and even more preferably 100 $m^2/g$ or more and 1,500 $m^2/g$ or less. If carbon black having a specific surface area of less than 20 $m^2/g$ is used, it may be difficult to obtain sufficient electrical conductivity. Carbon black having a specific surface area exceeding 1,500 $m^2/g$ is difficult to obtain in the market.

Examples of commercially available carbon black include, but are not limited to, TOKABLACK #4300, #4400, #4500, #5500, etc. (furnace black manufactured by Tokai Carbon Co., Ltd.), Printex L, etc. (furnace black manufactured by Degussa-Hüls AG), Raven 7000, 5750, 5250, 5000 ULTRAIII, 5000 ULTRA, etc. Conductex SC ULTRA, Conductex 975 ULTRA, etc. PUER BLACK 100, 115, 205, etc. (furnace black manufactured by Columbian Chemicals Co.), #2350, #2400B, #2600B, #3050B, #3030B, #3230B, #3350B, #3400B, #5400B, etc. (furnace black manufactured by Mitsubishi Chemical Corporation), MONARCH 1400, 1300, 900, Vulcan XC-72R, Black Pearls 2000, etc. (furnace black manufactured by Cabot Corporation), Ensaco 250G, Ensaco 260G, Ensaco 350G, Super P-Li (manufactured by TIMCAL Ltd.), Ketjen Black E-300J and EC-600JD (manufactured by Akzo Nobel N.V.), Denka Black, Denka Black HS-100, or FX-35 (acetylene black manufactured by Denka Company Limited). These carbon black materials may be used in combination of two or more.

[Binder Resin]

When forming a negative-electrode composite layer 12, a binder resin is used for the purposes of binding between particles of the negative-electrode active material and enhancing adhesion to the substrate. The binder resin is preferred to be an acrylic resin which may, for example, be a polymer emulsion.

[Polymer Emulsion]

The binder resin is preferred to be a polymer emulsion, for example, whose glass-transition temperature is in the range of −20° C. or more and 20° C. or less. Such a polymer emulsion is preferred to be, for example, an acrylic emulsion obtained by mixing 1 wt % or more and 5 wt % or less of a first monomer containing hydratable functional groups, 20 wt % or more and 60 wt % or less of a second monomer containing aromatic rings, and 35 wt % or more and 79 wt % or less of a third monomer containing no hydratable functional groups or aromatic rings, and synthesizing this monomer mixture by emulsion polymerization. When the negative-electrode composite layer 12 contains this emulsion, electrical conductivity and charge-discharge cycle characteristics (cycle life) of the negative electrode are both further improved.

[First Monomer]

The first monomer is a monomer containing hydratable functional groups. Examples of the first monomer include hydroxy group-containing monomers such as hydroxyethyl acrylate (glass-transition temperature Tg of homopolymer=−15° C., simply expressed as "Tg=" below), hydroxypropyl acrylate (Tg=−7° C.), hydroxybutyl acrylate (Tg=−80° C.), hydroxyethyl methacrylate (Tg=55° C.), hydroxypropyl methacrylate (Tg=26° C.), and hydroxybutyl methacrylate (Tg=−40° C.); amide group-containing monomers such as acrylamide (Tg=153° C.), methacryl amide (Tg=77° C.), diacetone acrylamide (Tg=77° C.), N-isopropylacrylamide (Tg=134° C.), N-methyl acrylamide (Tg=130° C.), N-methylmethacrylamide (Tg=65° C.), N,N-dimethylacrylamide (Tg=119° C.), N-ethyl acrylamide (Tg=100° C.), N,N-diethyl acrylamide (Tg=81° C.), N-butyl acrylamide (Tg=46° C.), hydroxyethyl acrylamide (Tg=98° C.), and acryloyl morpholine (Tg=145° C.); and glycidyl group-containing monomers such as glycidyl methacrylate (Tg=41° C.), and glycidyl acrylate (Tg=10° C.).

The amount of the first monomer used is preferred to be in the range of 1 wt % or more and 5 wt % or less, and more preferably 2 wt % or more and 4 wt % or less, relative to the total amount of monomers. When the amount is 1 wt % or more, chemical stability may be further improved due to the effect of hydration with water molecules. When the amount is 5 wt % or less, stability during emulsion polymerization may be enhanced even more. Specifically, the emulsion, of which the fluidity has been increased, is less likely to aggregate.

[Second Monomer]

The second monomer will be explained. Use of a second monomer can reduce the used amount of a material, e.g., acrylic acid alkyl ester, which is easily hydrolyzed in an alkaline solution, and therefore alkali resistance can be further improved. Furthermore, by controlling the glass-transition point of the emulsion to a suitable range, adhesion to the substrate can be improved even more.

The amount of the second monomer used is preferred to be in the range of 20 wt % or more and 60 wt % or less, and more preferably 25 wt % or more and 55 wt % or less, relative to the total amount of monomers. When the amount is 20 wt % or more, the polymer may be further improved in alkali resistance. When the amount is 60 wt % or less, adhesion to the substrate may be improved even more.

The second monomer may be a styrene (glass-transition temperature Tg of homopolymer=100° C., simply expressed as "Tg=" below), α-methylstyrene (Tg=168° C.), benzyl methacrylate (Tg=54° C.), or the like.

[Third Monomer]

The third monomer will be explained.

The third monomer of the present embodiment is a radically polymerizable monomer other than the first and second monomers.

Examples of the third monomer include methacrylic acid esters such as methyl methacrylate (Tg=100° C.), ethyl methacrylate (Tg=65° C.), butyl methacrylate (Tg=20° C.), isobutyl methacrylate (Tg=67° C.), tert-butyl methacrylate (Tg=107° C.), 2-ethylhexyl methacrylate (Tg=−10° C.), and cyclohexyl methacrylate (Tg=66° C.); and acrylic esters such as methyl acrylate (glass-transition temperature Tg of homopolymer=−8° C., simply expressed as "Tg=" below), ethyl acrylate (Tg=−20° C.), butyl acrylate (Tg=−45° C.), and 2-ethylhexyl acrylate (Tg=−55° C.).

The third monomer is preferred to be appropriately selected so that the polymer will have a theoretical glass-transition temperature Tg in the range of −20° C. or more and 20° C. or less. The range of the theoretical glass-transition temperature Tg of the polymer is more preferred to be −15° C. or more and 15° C. or less.

The theoretical glass-transition temperature Tg of the polymer of the present embodiment can be derived from the following Formula [I].

$$1/Tg=[(W1/Tg1)+(W2/Tg2)+ \ldots +(Wn/Tgn)]/100 \quad [I]$$

where: W1: wt % of monomer 1; Tg1: Glass-transition temperature (K) of homopolymer that can be formed of monomer 1 only; W2: wt % of monomer 2; Tg2: Glass-transition temperature (K) of homopolymer that can be formed of monomer 2 only; Wn: wt % of monomer n; Tgn: Glass-transition temperature (K) of homopolymer that can be formed of monomer n only; herein, W1+W2+ . . . +Wn=100.

If an emulsifier having radically polymerizable unsaturated groups is used when polymerizing radically polymerizable unsaturated monomers in an aqueous medium, this emulsifier is not included in these monomers when specifying the configuration of these monomers and calculating Tg of the copolymer.

[Emulsifier]

The binder resin of the present embodiment is copolymerized by emulsion polymerization. When copolymerized, an emulsifier is preferred to be used from the perspective of polymerization stability.

The emulsifier is preferred to be used at a ratio in the range of 0.1 parts by weight or more and 5 parts by weight or less, and more preferably 1 part by weight or more and 3 parts by weight or less, relative to the total 100 parts by weight of the monomers used. When the amount of the emulsifier is 0.1 parts by weight or more, polymerization stability is improved even more. When the amount of the emulsifier is 5 parts by weight or less, alkali resistance of the secondary battery electrodes is improved even more.

In the present embodiment, an anionic emulsifier and a nonionic emulsifier may be used singly or in combination as an emulsifier. The emulsifier may be a reactive emulsifier having radically polymerizable functional groups or may be a non-reactive emulsifier having no radically polymerizable functional groups. Alternatively, these emulsifiers may be used in combination.

Of the emulsifiers used in the present embodiment, the reactive emulsifier is an anionic or nonionic emulsifier having one or more radically polymerizable unsaturated double bonds in a molecule. For example, the emulsifier used may be a sulfosuccinate ester-based emulsifier (e.g., commercially available LATEMUL S-120P or S-180A manufactured by Kao Corporation, or ELEMINOL JS-2 manufactured by Sanyo Chemical Industries, Ltd.), or an alkylphenol ether-based emulsifier (e.g., commercially available Aquaron KH-10 or RN-20 manufactured by DKS Co. Ltd.).

Of the emulsifiers used in the present embodiment, the non-reactive emulsifier may be an anionic or nonionic non-reactive emulsifier.

Anionic Non-Reactive Emulsifier

Examples of the anionic non-reactive emulsifier may include polyoxyethylene alkyl phenyl ether sulfate, polyoxyethylene polycyclic phenyl ether sulfate, and polyoxyethylene alkyl ether sulfate.

Specifically, the anionic non-reactive emulsifier may be Hitenol NF-08 [the number of repetition of ethylene oxide units (termed EO unit number hereinafter): 8] or NF-17 (EO unit number: 17) both manufactured by DKS Co. Ltd.; or ELEMINOL CLS-20 (EO unit number: 10), ELEMINOL ES-12 (EO unit number: 6), ES-30 (EO unit number: 15), or ES-70 (EO unit number: 35) all manufactured by Sanyo Chemical Industries, Ltd.

Nonionic Non-Reactive Emulsifier

Examples of the nonionic non-reactive emulsifier may include polyoxyethylene alkyl phenyl ethers such as polyoxyethylene nonyl phenyl ether, and polyoxyethylene octyl phenyl ether; polyoxyethylene alkyl ethers such as polyoxyethylene lauryl ether, polyoxyethylene stearyl ether, and polyoxyethylene oleyl ether; polyoxy polycyclic phenyl ethers such as polyoxyethylene distyrenated phenyl ether; and polyoxyethylene sorbitan fatty acid ester.

Specifically, the nonionic non-reactive emulsifier may be Emulgen 1108 (EO unit number: 8), 1118S-70 (EO unit number: 18), 1135S-70 (EO unit number: 35) or 1150S-70 (EO unit number: 50) all manufactured by Kao Corporation.

These non-reactive emulsifiers may be used singly or in combination of two or more.

Of emulsifiers, known emulsifiers may used as reactive emulsifiers.

A radical polymerization initiator that can be used in the present embodiment may, for example, be persulfates such as potassium persulfate, ammonium persulfate, or sodium persulfate.

The amount of the polymerization initiator used is preferred to be in the range of 0.1 parts by weight or more and 1 part by weight or less, and more preferably 0.2 parts by weight or more and 0.8 parts by weight or less, relative to the total 100 parts by weight of the monomers used for emulsion polymerization. When the amount is 0.1 parts by weight or more, polymerization stability may be improved even more. When the amount is 1 part by weight or less, water resistance may be improved even more.

A redox initiator may also be preferably used, which is obtained by combining a peroxide initiator with a reducing agent. As a redox initiator, a peroxide initiator may preferably be combined with a reducing agent. The peroxide initiator may be perbutyl H (tert-butyl hydroperoxide), perbutyl O (tert-butyl peroxy-2-ethyl hexanoate), cumene hydroperoxide, or p-menthane hydroperoxide. The reducing agent may be elbit N (sodium isoascorbate), L-ascorbic acid (vitamin C), sodium sulfite, sodium hydrogen sulfite, or sodium pyrosulfite (SMBS), sodium hyposulfite (hydrosulfite).

The composite ink (negative-electrode composition for alkaline secondary batteries) is preferred to be obtained by mixing a binder resin at a ratio in the range of 0.05 parts by weight or more and 20 parts by weight or less, more preferably 0.1 parts by weight or more and 10 parts by weight or less, relative to 100 parts by weigh of an active material. If the amount of the composite ink is less than 0.05 parts by weight, binding strength between particles of the active material may be reduced. Consequently, contact between the active material and the substrate 11 is not necessarily maintained, and thus the utilization ratio of the positive electrode may be lowered. If the amount of the composite ink exceeds 20 parts by weight, the ratio of the active material in the composite ink is lowered, and thus the energy density of the electrodes is likely to be lowered. In addition, increase in the ratio of the polymer, which is less likely to pass current therethrough, may lead to increase of electrical resistance of the electrodes.

As necessary, a film forming aid, antifoam, leveling agent, dispersant, preservative, pH adjuster, viscosity modifier, or the like may be mixed into the composite ink.

Viscosity of the composite ink may be appropriately selected according to the coating method, but is preferred to be in the range of 100 mPa·s or more and 30,000 mPa·s or less.

(Method of Producing Alkaline Secondary Battery Negative Electrode)

A method of producing an alkaline secondary battery negative electrode includes forming a negative-electrode composite layer 12 on a substrate 11.

In the process of forming a negative-electrode composite layer 12, a composite ink (negative-electrode composition for alkaline secondary batteries) containing a binder resin, active material, and electrically conductive agent is applied onto a substrate 11, followed by drying.

After forming the negative-electrode composite layer 12 on the substrate 11, the alkaline secondary battery negative electrode 10 may be pressed using a planographic press, calender roll, or the like. Due to the pressing, adhesion between the substrate 11 and the negative-electrode composite layer 12 is improved even more.

[Disperser/Mixer]

To disperse and mix an active material and a binder resin when producing a composite ink, a disperser or mixer usually used for dispersing pigments or the like may be used. Examples of the disperser/mixer include, but are not limited to, mixers such as a Disper, homomixer, or planetary mixer; homogenizers such as CLEARMIX manufactured by M Technique, or FILMIX manufactured by PRIMIX Corporation; media dispersers such as a paint conditioner (manufactured by Red Devil), a ball mill or sand mill (e.g., DYNO-MILL manufactured by Shinmaru Enterprises Corporation), an attritor or pearl mill (e.g., DCP mill manufactured by Maschinenfabrik Gustav Eirich GmbH), or a co-ball mill; medialess dispersers such as a wet jet mill (e.g., GENUS PY manufactured by Genus, Star Burst manufactured by Sugino Machine Limited, or Nanomizer manufactured by Nanomizer Inc.), CLEAR SS-5 manufactured by M Technique, or MICROS manufactured by Nara Machinery Co., Ltd.; or other roll mills. The disperser is preferred to be one subjected to treatment of preventing mixing of metal into the ink from the disperser.

For example, if a media disperser is used, it is preferred that the agitator and the vessel thereof are made of ceramic or resin, or surfaces of the metal agitator and the vessel thereof have undergone thermal spraying of tungsten carbide, resin coating, or the like. The media used are preferred to be glass beads, or ceramic beads such as zirconia beads or alumina beads. If a roll mill is used, the rolls are preferred to be made of ceramic. Only one type of dispersing device may be used, or two or more types of dispersing devices may be used in combination.

(Alkaline Secondary Battery)

An alkaline secondary battery including the alkaline secondary battery negative electrode of the present embodiment includes an alkaline secondary battery negative electrode of the present embodiment, a positive electrode, an electrolytic solution, and a separator.

Specifically, the positive electrode may be at least a laminate in which a substrate, a primer layer and a positive-electrode composite layer are laminated in this order or in which a substrate sandwiched between two primer layers is laminated with a positive-electrode composite layer. The primer layer is formed by applying a primer composition to one surface or each of both surfaces of a substrate. The positive-electrode composite layer is formed by applying a composite ink containing an electrically conductive agent onto the primer layer.

The alkaline secondary battery including the alkaline secondary battery negative electrode of the present embodiment can have various shapes, such as a sheet shape, cylindrical shape, coin shape, button shape or laminate shape, depending on the purposes of use.

The electrolytic solution may be a potassium hydroxide solution, or a solution obtained by adding sodium hydroxide or lithium hydroxide to a potassium hydroxide solution, or other solutions.

Examples of the separator include, but are not particularly limited to, a polyethylene non-woven fabric, polypropylene non-woven fabric, polyamide non-woven fabric, and a fabric obtained by hydrophilically treating these fabrics.

The alkaline secondary battery including the alkaline secondary battery negative electrode of the present embodiment can be favorably used in electrical substations, buses, trucks, electric trains, and the like.

EXAMPLES

The present invention will be more specifically described by way of examples. However, the following examples should not limit the scope of the claims of the present invention. It should be noted that the term "part(s)" used in the examples and comparative examples refers to "part(s) by weight".

Example 1

[Preparation of Negative-Electrode Ink]

First, 60 parts by weight of water was put in a wet bead mill and circulated during which 40 parts by weight of hydrogen storage alloy was added as an active material (A), and the mixture was crushed so that the value of D50 (average particle size X) in a cumulative particle size distribution would be 8 μm and the value of D20 (particle size Y) in a cumulative particle size distribution would be 2.4 μm (30% of the average particle size X).

100 parts of the crushed hydrogen storage alloy, 10 parts of an acrylic emulsion (TOCRYL S-171 manufactured by Toyochem Co., Ltd., 42% nonvolatile content, theoretical glass-transition temperature Tg of polymer=−2° C.) as a binder resin (B) and as a nonvolatile content, and 10 parts of carbon (Tokablack #4300 manufactured by Tokai Carbon Co., Ltd.) as an electrically conductive agent (C) were mixed with each other. Then, pure water was added to the mixture so that residual solids after drying would be 60%, followed by stirring for 15 minutes using a Disper. Thus a negative-electrode ink (negative-electrode composition for alkaline secondary batteries) was prepared.

[Formation of Negative-Electrode Composite Layer]

After that, the negative-electrode ink was applied, using an applicator, to both surfaces of a substrate formed of an Ni-plated steel plate having a thickness of 15 μm so that the applied ink would have a coating weight of 200 g/m², thereby forming negative-electrode composite layers each having a dry thickness of 100 Thus, a negative electrode of Example 1 was prepared. Specifically, when preparing the negative electrode, the negative-electrode composite layers were formed so that the total thickness thereof would be 150 and the coating weight of the negative-electrode active material therein would be 450 g/m². Accordingly, the negative electrodes of Example 1, the following Examples 2 to 10, and Comparative Examples 1 to 4 each had a thickness of 215

[Preparation of Positive-Electrode Ink]

10 parts of carbon (Tokablack #4300 manufactured by Tokai Carbon Co., Ltd.), and 10 parts of an acrylic emulsion (TOCRYL S-171 manufactured by Toyochem Co., Ltd., 42% nonvolatile content, theoretical glass-transition temperature Tg of polymer=−2° C.) as a binder resin and as a nonvolatile content were added to 100 parts of nickel hydroxide. Then, pure water was also added so that residual solids after drying would be 60%, followed by stirring for 15 minutes using a Disper. Thus, a positive-electrode ink was prepared.

[Preparation of Primer Composition]

5 parts of dispersant (Joncryl 70J manufactured by BASF SE) was added to 100 parts of foliar graphite (UP-20 manufactured by Nippon Graphite Industry Co., Ltd.) having an average particle size of 25 μm and an aspect ratio of 68, as an electrically conductive material. Then, pure water was also added so that residual solids after drying would be 30%, thereby preparing a primer composition. Then, the primer composition was subjected to 20-pass dispersion treatment using a bead mill.

[Formation of Primer Layers]

The primer composition was applied, by an applicator, to both surfaces of a substrate formed of an Ni-plated steel plate having a thickness of 15 μm, followed by drying, thereby forming primer layers. The primer layer formed on each surface had a thickness of 1 μm.

[Formation of Positive-Electrode Composite Layer]

The positive-electrode ink was applied, using an applicator, onto each of the primer layers so as to have a coating weight of 150 g/m², thereby forming positive-electrode composite layers each having a dry thickness of 100 μm. Thus, a positive electrode was prepared. Specifically, in the positive electrode, the positive-electrode composite layers were formed so that the total thickness thereof would be 200 μm, and the coating weight of the positive-electrode active material therein would be 300 g/m². Accordingly, the positive electrodes of Example 1, the following Examples 2 to 11, and Comparative Examples 1 to 4 each had a total thickness of 217 μm.

[Preparation of Alkaline Secondary Battery]

The negative electrode, a sulfonated PP non-woven fabric separator having a thickness of 200 μm, and the positive electrode were laminated in this order in a coin cell. Then, an alkaline electrolytic solution was injected to the coin cell, followed by curing for one day to impregnate the laminate with the electrolytic solution. Thus, an alkaline secondary battery of Example 1 was prepared.

Example 2

A negative-electrode composition for alkaline secondary batteries of Example 2 was prepared as in Example 1, except that the particle size Y of the active material (A) was 5.6 μm.

Then, an alkaline secondary battery negative electrode of Example 2 was prepared as in Example 1, using the negative-electrode composition for alkaline secondary batteries of Example 2.

Then, an alkaline secondary battery of Example 2 was prepared as in Example 1, using the alkaline secondary battery negative electrode of Example 2.

Example 3

A negative-electrode composition for alkaline secondary batteries of Example 3 was prepared as in Example 1, except that the particle size Y of the active material (A) was 4.8 μm.

Then, an alkaline secondary battery negative electrode of Example 3 was prepared as in Example 1, using the negative-electrode composition for alkaline secondary batteries of Example 3.

Then, an alkaline secondary battery of Example 3 was prepared as in Example 1, using the alkaline secondary battery negative electrode of Example 3.

Example 4

A negative-electrode composition for alkaline secondary batteries of Example 4 was prepared as in Example 3, except that 10 parts of graphite were added as an electrically conductive agent (C), instead of 10 parts of carbon.

Then, an alkaline secondary battery negative electrode of Example 4 was prepared as in Example 1, using the negative-electrode composition for alkaline secondary batteries of Example 4.

Then, an alkaline secondary battery of Example 4 was prepared as in Example 1, using the alkaline secondary battery negative electrode of Example 4.

Example 5

A negative-electrode composition for alkaline secondary batteries of Example 5 was prepared as in Example 3, except that 9 parts of carbon and 1 part of carbon nanotubes (CNTs) were added as an electrically conductive agent (C), instead of 10 parts of carbon.

Then, an alkaline secondary battery negative electrode of Example 5 was prepared as in Example 1, using the negative-electrode composition for alkaline secondary batteries of Example 5.

Then, an alkaline secondary battery of Example 5 was prepared as in Example 1, using the alkaline secondary battery negative electrode of Example 5.

Example 6

A negative-electrode composition for alkaline secondary batteries of Example 6 was prepared as in Example 3, except that 9 parts of graphite and 1 part of carbon nanotubes (CNTs) were added as an electrically conductive agent (C), instead of 10 parts of carbon.

Then, an alkaline secondary battery negative electrode of Example 6 was prepared as in Example 1, using the negative-electrode composition for alkaline secondary batteries of Example 6.

Then, an alkaline secondary battery of Example 6 was prepared as in Example 1, using the alkaline secondary battery negative electrode of Example 6.

Example 7

A negative-electrode composition for alkaline secondary batteries of Example 7 was prepared as in Example 3, except that 10 parts of carbon nanotubes (CNTs) were added as an electrically conductive agent (C), instead of 10 parts of carbon.

Then, an alkaline secondary battery negative electrode of Example 7 was prepared as in Example 1, using the negative-electrode composition for alkaline secondary batteries of Example 7.

Then, an alkaline secondary battery of Example 7 was prepared as in Example 1, using the alkaline secondary battery negative electrode of Example 7.

Example 8

A negative-electrode composition for alkaline secondary batteries of Example 8 was prepared as in Example 1, except that the active material (A) had an average particle size X of 10 μm and a particle size Y of 7 μm.

Then, an alkaline secondary battery negative electrode of Example 8 was prepared as in Example 1, using the negative-electrode composition for alkaline secondary batteries of Example 8.

Then, an alkaline secondary battery of Example 8 was prepared as in Example 1, using the alkaline secondary battery negative electrode of Example 8.

Example 9

A negative-electrode composition for alkaline secondary batteries of Example 9 was prepared as in Example 1, except that the active material (A) had an average particle size X of 10 μm and a particle size Y of 3 μm.

Then, an alkaline secondary battery negative electrode of Example 9 was prepared as in Example 1, using the negative-electrode composition for alkaline secondary batteries of Example 9.

Then, an alkaline secondary battery of Example 9 was prepared as in Example 1, using the alkaline secondary battery negative electrode of Example 9.

Example 10

A negative-electrode composition for alkaline secondary batteries of Example 10 was prepared as in Example 1, except that the active material (A) had an average particle size X of 10 μm and a particle size Y of 5 μm.

Then, an alkaline secondary battery negative electrode of Example 10 was prepared as in Example 1, using the negative-electrode composition for alkaline secondary batteries of Example 10.

Then, an alkaline secondary battery of Example 10 was prepared as in Example 1, using the alkaline secondary battery negative electrode of Example 10.

Example 11

A negative-electrode composition for alkaline secondary batteries of Example 11 was prepared as in Example 10.

Then, an alkaline secondary battery negative electrode of Example 11 was prepared as in Example 10, except that the substrate had a thickness of 45 μm, using the prepared negative-electrode composition for alkaline secondary batteries.

Then, an alkaline secondary battery of Example 11 was prepared as in Example 10, using the alkaline secondary battery negative electrode of Example 11.

Comparative Example 1

A negative-electrode composition for alkaline secondary batteries of Comparative Example 1 was prepared as in Example 1, except that the active material (A) had an average particle size X of 15 μm and a particle size Y of 6 μm.

Then, an alkaline secondary battery negative electrode of Comparative Example 1 was prepared as in Example 1, using the negative-electrode composition for alkaline secondary batteries of Comparative Example 1.

Then, an alkaline secondary battery of Comparative Example 1 was prepared as in Example 1, using the alkaline secondary battery negative electrode of Comparative Example 1.

Comparative Example 2

A negative-electrode composition for alkaline secondary batteries of Comparative Example 2 was prepared as in Example 1, except that the active material (A) had a particle size Y of 6 μm.

Then, an alkaline secondary battery negative electrode of Comparative Example 2 was prepared as in Example 1, using the negative-electrode composition for alkaline secondary batteries of Comparative Example 2.

Then, an alkaline secondary battery of Comparative Example 2 was prepared as in Example 1, using the alkaline secondary battery negative electrode of Comparative Example 2.

Comparative Example 3

A negative-electrode composition for alkaline secondary batteries of Comparative Example 3 was prepared as in Example 1, except that the active material (A) had a particle size Y of 1.8 μm.

Then, an alkaline secondary battery negative electrode of Comparative Example 3 was prepared as in Example 1, using the negative-electrode composition for alkaline secondary batteries of Comparative Example 3.

Then, an alkaline secondary battery of Comparative Example 3 was prepared as in Example 1, using the alkaline secondary battery negative electrode of Comparative Example 3.

Comparative Example 4

A negative-electrode composition for alkaline secondary batteries of Comparative Example 4 was prepared as in Example 3, except that the composition contained no electrically conductive agent (C).

Then, an alkaline secondary battery negative electrode of Comparative Example 4 was prepared as in Example 1, using the negative-electrode composition for alkaline secondary batteries of Comparative Example 4.

Then, an alkaline secondary battery of Comparative Example 4 was prepared as in Example 1, using the alkaline secondary battery negative electrode of Comparative Example 4.

Evaluations

The alkaline secondary batteries of Examples 1 to 11 and Comparative Examples 1 to 4 prepared as described above were evaluated based on the following points in terms of cycle life and output characteristics.

<Cycle Life>

The alkaline secondary batteries of Examples 1 to 11 and Comparative Examples 1 to 4 were subjected to 10-cycle activation treatment, each cycle including 120% charge at 0.2c and discharge to 1.0 V at 0.2c. After that, 60-minute charge at 1c, 10-minute interval, discharge to 1.0 V at 1c, and 10-minute interval were defined to be one cycle, and this cycle was repeatedly performed without a break. After that, each test was terminated at a point when the discharge utilization ratio was just below 60%, and the number of cycles then was taken to be a cycle life. The results were evaluated based on the following evaluation criteria. The evaluations are shown in Table 1.

[Evaluation Criteria]

Excellent: Cycle life was equivalent to 2,000 cycles or more.

Good: Cycle life was equivalent to 1,000 cycles or more and less than 2,000 cycles.

Poor: Cycle life was equivalent to 500 cycles or more and less than 1,000 cycles.

Very poor: Cycle life equivalent to less than 500 cycles

<Output Characteristics>

Discharge utilization ratios of the alkaline secondary batteries of Examples 1 to 11 and Comparative Examples 1 to 4 were respectively measured at the points when they were discharged to 1.0 V at 10c, at 20c, and at 40c, from a fully charged state at 1c, and output characteristics were evaluated based on the following evaluation criteria. The evaluations are shown in Table 1.

powder having a predetermined particle size distribution exhibited favorable cycle life and output characteristics, and had improved outputs while exhibiting improved high input/output characteristics balanced with durability, compared to Comparative Examples 1 to 4. Of Comparative Examples 1 to 4, those (Comparative Examples 1 and 2) which contained hydrogen storage alloy that contained an excessively large amount of micro-powder having a predetermined particle size distribution exhibited unfavorable output characteristics, while Comparative Example 3 containing an excessively small amount of micro-powder having a predetermined particle size distribution exhibited unfavorable cycle life. Comparison of Examples 3 to 7 with Comparative Example 4 revealed that containing a carbon-based material (electrically conductive agent) could alleviate increase of electrical resistance caused by the binder and could minimize oxidative deterioration of the hydrogen storage alloy.

In this way, as can be seen from Table 1, there can be provided a negative-electrode composition for alkaline secondary batteries and an alkaline secondary battery negative electrode, which can achieve am improved high-level balance between the output characteristics and cycle life.

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Average particle size X (μm) | 8 | 8 | 8 | 8 | 8 | 8 | 8 | 10 |
| Particle size Y (μm) | 2.4 | 5.6 | 4.8 | 4.8 | 4.8 | 4.8 | 4.8 | 7 |
| Carbon (part(s)) | 10 | 10 | 10 | 0 | 9 | 0 | 0 | 10 |
| Graphite (part(s)) | 0 | 0 | 0 | 10 | 0 | 9 | 0 | 0 |
| CNT (part(s)) | 0 | 0 | 0 | 0 | 1 | 1 | 10 | 0 |
| Evaluation Output characteristics | Excellent | Good | Good | Good | Excellent | Excellent | Good | Good |
| Cycle life | Good | Good | Good | Good | Good | Good | Good | Excellent |

|  | Ex. 9 | Ex. 10 | Ex. 11 | Comp. Ex. 1 | Comp. Ex. 2 | Comp. Ex. 3 | Comp. Ex. 4 |
|---|---|---|---|---|---|---|---|
| Average particle size X (μm) | 10 | 10 | 10 | 15 | 8 | 8 | 8 |
| Particle size Y (μm) | 3 | 5 | 5 | 6 | 6 | 1.8 | 4.8 |
| Carbon (part(s)) | 10 | 10 | 10 | 10 | 10 | 10 | 0 |
| Graphite (part(s)) | 0 | 0 | 0 | 0 | 0 | 0 | 0 |
| CNT (part(s)) | 0 | 0 | 0 | 0 | 0 | 0 | 0 |
| Evaluation Output characteristics | Good | Good | Good | Very poor | Poor | Excellent | Poor |
| Cycle life | Good | Excellent | Good | Excellent | Good | Poor | Very poor |

[Evaluation Criteria]

Excellent: Discharge utilization ratio at 40c was 60% or more.

Good: Discharge utilization ratio at 20c was 80% or more and discharge utilization ratio at 40c was less than 60%.

Poor: Discharge utilization ratio at 10c was 90% or more and discharge utilization ratio at 20c was less than 80%.

Very poor: Discharge utilization ratio at 10c was less than 90%.

<Comprehensive Evaluations>

Comprehensive evaluations refer to evaluations comprehensively evaluating the individual batteries in terms of cycle life and output characteristics. Specifically, the examples evaluated to be excellent or good indicate that they have favorable cycle life and output characteristics, while the examples evaluated to be poor or very poor indicate that they have unfavorable cycle life and output characteristics.

As shown in Table 1, Examples 1 to 11 in which the hydrogen storage alloy was defined to contain a micro-

REFERENCE SIGNS LIST

10 Alkaline secondary battery negative electrode; 11 Substrate; 12 (12A, 12B) Negative-electrode composite layer.

What is claimed is:

1. An alkaline secondary battery comprising a negative electrode comprising a sheet-shaped metal substrate on which a negative-electrode composition is laminated, the negative-electrode composition comprises:
   an active material,
   a binder resin, and,
   an electrically conductive agent containing an electrically conductive carbon material; wherein
   when a value of D50 is defined to be an average particle size X and a value of D20 is defined to be a particle size Y in a cumulative particle size distribution obtained by measuring the active material using a laser diffractometry particle size distribution meter, and the average particle size X is from 8 μm to 10 μm, and the particle size Y is in a range of 30% or more and 70% or less of the average particle size X, and wherein the active material is a hydrogen storage alloy.

2. The alkaline secondary battery of claim 1, wherein the particle size Y is in a range of 40% or more and 60% or less of the average particle size X.

3. The alkaline secondary battery of claim 1, wherein the sheet-shaped metal substrate has a thickness in a range of 4 μm or more and 40 μm or less.

* * * * *